No. 794,212. PATENTED JULY 11, 1905.
G. H. BENJAMIN.
METALLURGICAL FURNACE.
APPLICATION FILED MAR. 31, 1903.

2 SHEETS—SHEET 1.

WITNESSES:
J. E. Pearson
Frank O'Connor

INVENTOR
Geo. H. Benjamin

No. 794,212. PATENTED JULY 11, 1905.
G. H. BENJAMIN.
METALLURGICAL FURNACE.
APPLICATION FILED MAR. 31, 1903.
2 SHEETS—SHEET 2.
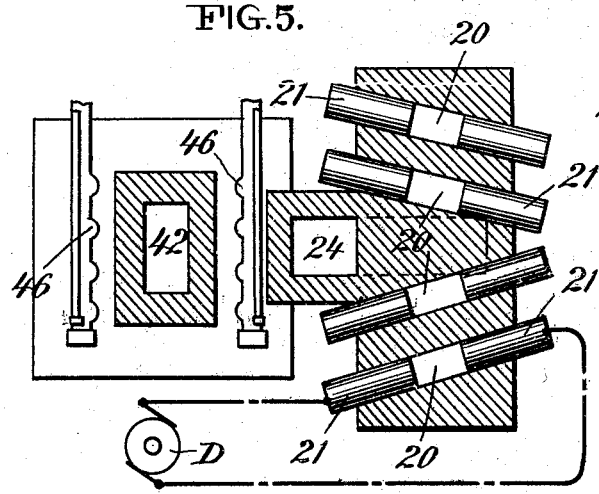
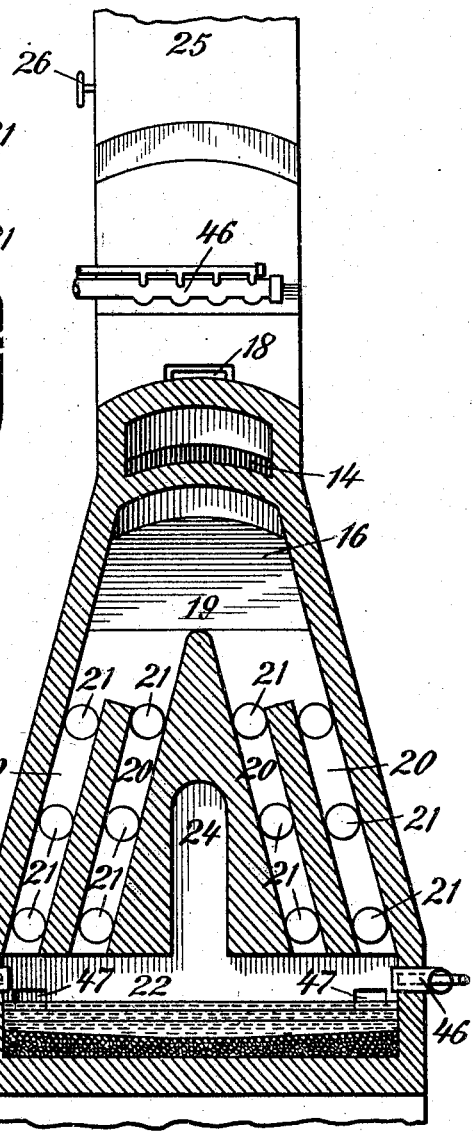
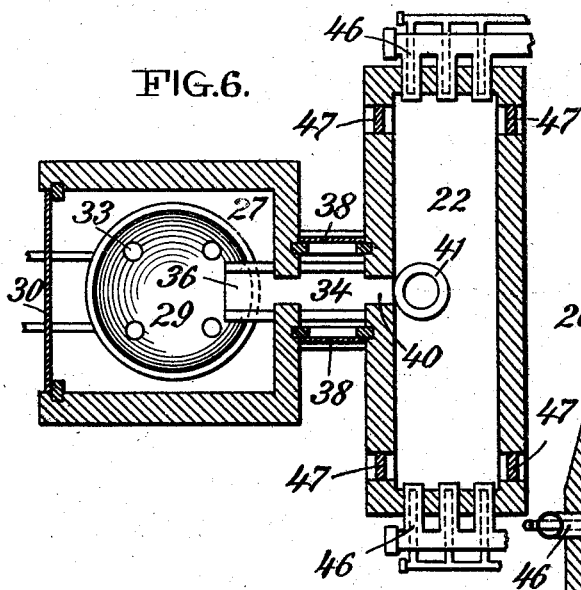
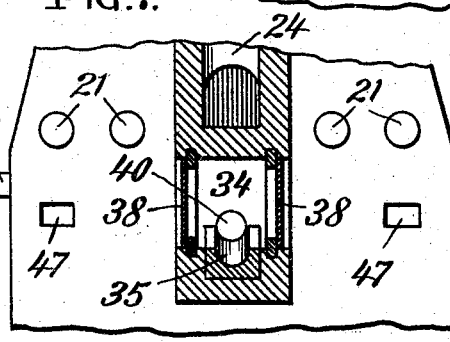
WITNESSES:
J. E. Pearson
Frank O'Connor
INVENTOR
Geo. H. Benjamin No. 794,212.  
Patented July 11, 1905.

UNITED STATES PATENT OFFICE.

GEORGE H. BENJAMIN, OF NEW YORK, N. Y.

METALLURGICAL FURNACE.

SPECIFICATION forming part of Letters Patent No. 794,212, dated July 11, 1905.

Application filed March 31, 1903. Serial No. 150,427.

*To all whom it may concern:*

Be it known that I, GEORGE HILLARD BENJAMIN, a citizen of the United States, residing at New York city, county and State of New York, have invented certain new and useful Improvements in Metallurgical Furnaces, of which the following is a specification.

My invention consists in a metallurgical furnace adapted to extract a metal from its ore; to bring about the conversion of a metal into a composite body—as, for instance, iron into steel; to effect the combination of two or more metals or bodies—such, for instance, as iron and nickel or iron, nickel, and carbon; to form a composite body during the process of extraction of one of such metals from its ore; to effect the formation of commercially-valuable products by adding to the material under treatment a chemically-active body or bodies—such as carbon, lime, &c.—which will combine with the materials accompanying the material under treatment or with the flux employed; to effect the independent heating of the metal under treatment and the metal or metals, chemical body or bodies to be introduced into such metal, and their combination at the zone of highest temperature employed in the metallurgical operations; to make use of the generated gases to effect the primary heating of the ore body, as well as those bodies which are subsequently to be combined with the metal reduced from the ore body.

The object of my invention is to facilitate the manufacture of and reduce the cost of the metallurgical operations involved in extracting a metal from its ore or in producing composite bodies of the character mentioned and, further, to convert heretofore commercially valueless slags into valuable ore bodies.

The accompanying drawings will serve to illustrate my invention, in which—

Figure 1:
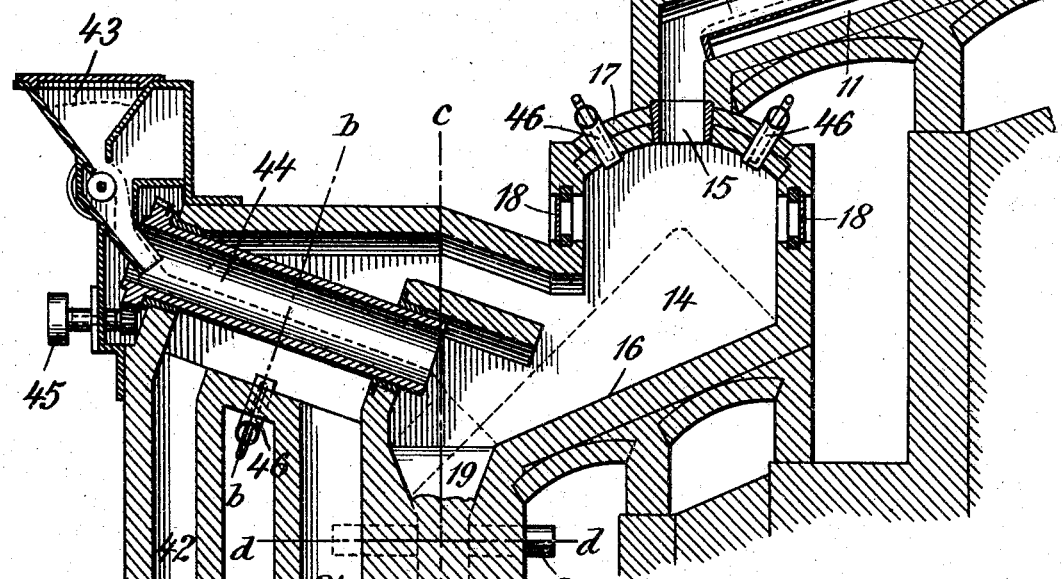
Figure 2:
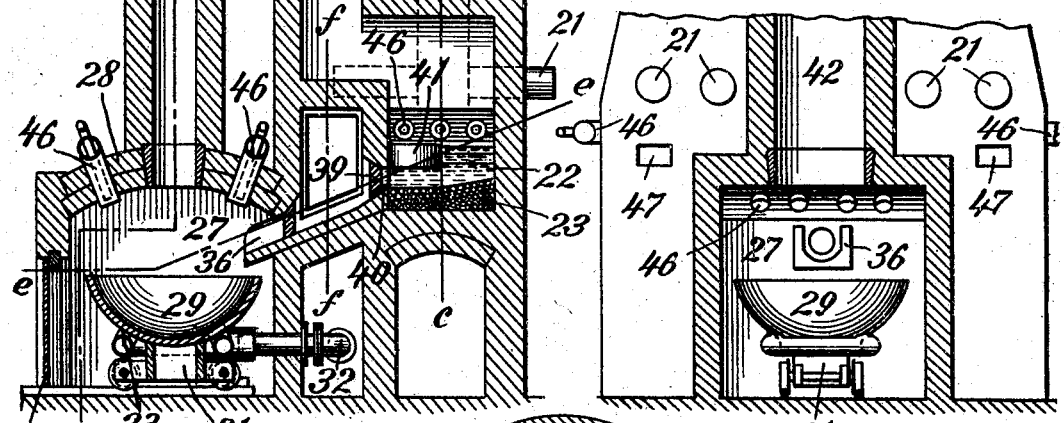
Figure 3:
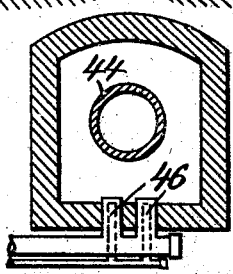

Figure 1 is a vertical section through the furnace structure; Fig. 2, a section on the line $a\,a$ of Fig. 1; Fig. 3, a section on the line $b\,b$ of Fig. 1; Fig. 4, a section on the line $c\,c$ of Fig. 1; Fig. 5, a section on the line $d\,d$ of Fig. 1; Fig. 6, a section on the line $e\,e$ of Fig. 1; Fig. 7, a section on the line $f\!f$ of Fig. 1.

Similar numerals indicate like parts.

In the drawings, 10 indicates a calcining-chamber, which may be of any suitable construction, preferably, however, having an inclined hearth 11; 12, a feed-hopper communicating with the top of the chamber; 13, a reciprocating rake for moving the ore downward along the hearth of the calcining-chamber. The calcining-chamber 10 is adapted to discharge into a reducing-chamber 14 through an opening 15 in the top of such chamber. The reducing-chamber is shown as having an inclined hearth 16 and its top formed as an arch 17 of considerable vertical height above the hearth. I do not limit myself in any wise to the described construction of the calcining and reducing chambers.

18 indicates a door through which access may be obtained to the interior of the reducing-chamber.

The reducing-chamber 14 discharges into a vertical chamber 19. (Best shown in Fig. 4.) This chamber I term the "electric" chamber. This chamber is gradually increased in width from above downward and is divided into four passage-ways 20, in the sides of which are located oppositely-disposed electrodes 21. (Best shown in Fig. 5.) The electrodes 21 may be formed of carbon rods, compacted bodies of carbon, or other suitable material and may receive their current from any suitable source of electrical energy—as, for instance, from a dynamo-electric machine D. Three sets of electrodes are shown in each passage. I do not limit myself in any wise to the character of the electrodes or to the number of the electrodes or to their exact disposition in the passage, as shown, provided they be so placed that the material discharged from the preheating-chambers into the electric chamber moves within the influence of the electric arcs created between the electrodes. The passages 20 of the electric chamber discharge into a basin 22, located under it and which is shown as somewhat wider than the electric chamber 19. This basin may have a hearth 23 of any suitable character—that is, I may form the hearth in the ordinary manner, as is usual with reverberatory furnaces of sand, clay, or other suitable materials or of materials which will combine with the metal or bodies accompanying the metal under treatment—that is, the hearth may be an acid hearth or a basic hearth, as desired. The basin 22 communicates with the reducing-chamber 14 through a flue 24, which flue serves to carry upward the radiated heat from the material deposited in the basin 22, the products of combustion from the flames emitted over the materials in the basin, as also a portion of the heavy gases generated under the influence of the electric arc. This flue 24 discharges at its upper end with the reducing-chamber and calcining-chamber and finally into a chimney-flue 25. 26 is a damper in the chimney-flue.

Located at a lower plane than the basin 22 is an oxidizing-chamber 27. This chamber is preferably formed with an arched top 28 and a removable hearth 29. The front of the chamber 27 is provided with a door 30, through which the hearth may be removed. The hearth 29 is shown as mounted on a truck 31 to facilitate its handling. Connected to the hearth 29 is a pipe 32, through which air may be introduced through openings 33 into the bottom of the hearth.

I do not limit myself to the employment of a removable hearth. A fixed hearth may be used, and the hearth may otherwise be modified.

Situated between the basin 22 and the oxidizing-chamber 27 is a passage 34, having concave or trough-like bottom 35, (best shown in Fig. 7,) on the forward end of which is a spout 36, adapted to discharge into the cavity of the hearth 29. In the sides of the passage 34 are the doors 38, which permit access to the interior of the passage.

39 indicates a plug of clay or other material which may be inserted in the opening 40 of the basin end of the passage 34 to stop the flow of material from the basin onto hearth 29. Floating in the material in the basin 22 is a clay ring 41, which serves to prevent the lighter materials, such as slag, from flowing through the trough-like passage 34 onto the hearth 29.

The top of the chamber 27 is connected by a flue 42 to the reducing-chamber 14, calcining-chamber 10, and stack 25.

Located above and to one side of the electric chamber 19 is a feed-hopper 43, which discharges into a cylindrical inclined heating-chamber 44, adapted to be rotated from any suitable source of power, as by means of a pulley 45. The cylindrical chamber 44 is adapted to discharge the material deposited in it from the hopper 43 into the top of the electric chamber 19, from whence it moves with the material discharged from the reducing-chamber 14 down the passages 20, past the electrodes 21, into the basin 22.

It will be observed from the description so far as given that the heat and gases set free in the chamber 27 and basin 22 all flow upward and around the cylindrical heating-chamber 44 and thence through the reducing-chamber and a portion of the calcining-chamber into the chimney-stack, thereby effecting the preliminary heating of the material introduced into the cylindrical heating-chamber 44, as well as into the calcining and reducing chambers, and which heating is effected before the materials are brought together in the electric chamber 19.

Any suitable means for adding to the heat of the chambers 14 44 27 and basin 22 may be used. Preferably I employ hydrocarbon-burners. Such hydrocarbon-burners 46 are shown arranged in the top of the chambers 14 and 27 and adapted to discharge their flame in a downward direction under the heating-chamber 44 and discharging in an upward direction. They may be otherwise arranged. Similar burners are arranged on opposite sides of the basin 22 and adapted to discharge their flames horizontally inward toward the center of the basin.

47 indicates doors in the front and back of the basin 22, near its ends, through which any portion of the material under treatment within the basin may be extracted, if desired.

The mode of operation of my improved furnace is as follows: Assuming it is desired to convert iron into pig metal, the ore is introduced into the hopper 12, from whence it passes on to the hearth 11 of the calcining-chamber. Here it is subjected to the required calcining temperature, which is comparatively low relative to that of the chambers 14, 19, and 27. In the calcining-chamber the ore parts with its moisture, which escapes through the chimney-flue 25. Under the action of the rake 13 the calcined ore is moved forward and downward and drops into the reducing-chamber 14 through the passage 15. Here the ore is subjected to a reducing atmosphere, due to the heat and gases from the electric chamber 19 and oxidizing-chamber 27 and, further, if required, to the combustion of gas and air introduced through the medium of the burners 46 in the roof of the chamber. The ore while in the reducing-chamber occupies approximately the position indicated by the dotted lines, and the ore may, if desired, be fluxed while in this chamber by lime or other material introduced through the door 18. Preferably, however, the flux is introduced in a highly-heated condition from the rotating heating-chamber 44. I may introduce at such time from such chamber lime or any other fluxing material or a mixture of such materials and carbon. Preferably, however, I introduce a highly-heated charge of lime or other fluxing material and then a highly-heated charge of carbon. The carbon used is preferably pure, such as may be derived from wood-charcoal, though coal or coke free from sulfur may be employed. As the ore is reduced in the reducing-chamber it flows toward the upper opening of the electric chamber, and the flux, carbon, or other material in a highly-heated condition is likewise discharged into such opening. When the melted ore, flux, carbon, or other material are introduced into the top of the electric chamber, they are brought into intimate contact and flow through the electric chamber, passing down the passages 20 as divided streams, where they are subjected to the physical effects of the electric arcs, the effect of which is to bring about various chemical combinations such as cannot be obtained at any temperature less than that of the electric arc, the final result being a separation of the metal of the ore from its accompanying impurities—such as silica, phosphorus, and other bodies—and the chemical combination of such bodies with the introduced flux and carbon to form solid carbids and gases. So far as I am at present able to state, there is formed calcium carbid, silicon carbid, cyanogen, carbon phosphide, carbonic oxid, as also various sulfur-carbon compounds in the form of gases. All of the bodies formed under the influence of the electric arcs in the electric chamber are deposited in the basin 22, where they separate, according to their specific gravity. The iron, being the heaviest, reaches the lowest level and settles on the bottom of the basin 22, the other bodies which at the time are fluid forming layers, as indicated in the drawings, upon the body of iron and from whence they may be drawn off through doors 47 in the ends of the basin 22. The iron, as will be seen from Fig. 1, is deposited upon a supplemental bed 23 in the bottom of the basin 22. This bed serves to protect the bottom of the basin and also may be formed of material which will chemically combine or react with any bodies foreign to the metal deposited on the hearth. The molten iron is drawn off from the basin 22 through the passage 34 and delivered by the spout 36 upon the hearth 29, located in the oxidizing-chamber 27. Owing to the fact that the iron in its passage through the electric chamber 19 will absorb more or less carbon, depending upon the amount of carbon introduced, provision is made for separating it from any excess of carbon in order to convert the iron into steel. This is accomplished by forcing an air-blast into the molten metal on the hearth 29 through pipe 32. An oxidizing atmosphere in the chamber may be created through the instrumentality of the burners 46. Should it be desired to form a combination of iron with some other metal—such, for instance, as nickel—I may introduce such metal into the flowing streams of melted ore from the reducing-chamber. As it reaches the electric chamber from the rotary heating-chamber the metal to be added, alone or accompanied with flux or other bodies, is heated to a high temperature in the rotary heating-chamber before introduction, accompanied by the melted ore from the reducing-chamber, into the electric chamber.

It will be observed from the above description that the features of novelty in my improved furnace consist, first, in the general construction of the furnace; second, in the arrangement of the various chambers of the furnace in which the metallurgical operations are carried on relative to each other; third, in the provision of means for introducing and primarily heating to a high temperature the flux, carbon, or other body to be combined with the melted ore in the electric chamber; fourth, in the provision of electric arcs in a chamber situated under and in proximity to the reducing and rotary chamber in which the materials to be combined are primarily heated before being brought into contact; fifth, in the employment of a basin under the electric chamber into which the materials combined under the influence of the electric arcs are deposited and allowed to separate by gravity; sixth, in the provision of means for drawing off separately the materials of different specific gravity; seventh, the provision of means for oxidizing any proportion of the carbon combined with the iron in the oxidizing-chamber or the oxidation of any accompanying material from any metal discharged in the oxidizing-chamber—as, for instance, the oxidation of sulfur, where the furnace is used for the reduction of copper ores.

The above description of my improved furnace has been made very general, and all details of specific construction have been omitted. This course has been adopted, as I wish it understood that I do not limit myself in any wise to the specific details of construction of the furnace considered as a whole or as regards its several parts, as it will be obvious to any one skilled in the art to which this invention belongs that very many changes may be made without departing from the intent of my invention.

Having thus described my invention, I claim—

1. A metallurgical furnace comprising in its construction, a calcining-chamber, a reducing-chamber, an electrically-heated chamber, and an oxidizing-chamber arranged at progressively lower levels, together with means for creating the required temperatures within said chambers.

2. A metallurgical furnace comprising in its construction, a chamber, means for creating a reducing atmosphere therein, an independent chamber for the material to be combined with the ore-body, means for heating said chamber, a chamber situated under said first-named chambers and into which they discharge, together with means for subjecting the combined materials in said last-named chamber to the physical effects of an electric arc.

3. A metallurgical furnace comprising in its construction, a reducing-chamber, an independent heating-chamber, an electrically-heated chamber situated under said chambers, a basin under said last-named chamber, and means for creating the required temperatures in said chambers.

4. A metallurgical furnace comprising in its construction, a reducing-chamber, a heating-chamber, an electrically-heated chamber, a basin under said last-named chamber, an oxidizing-chamber, a hearth in said oxidizing-chamber, a passage-way between said basin and said hearth, and means for creating the required temperatures in said chambers.

5. A metallurgical furnace comprising in its construction, a chamber with an inclined bottom, means for creating a reducing atmosphere in said chamber, an independent chamber for the material to be combined with the ore-body, means for heating said chamber, a vertically-arranged chamber situated under said first-named chambers and into which they discharge, together with means for subjecting the combined materials passing through said last-named chamber to the physical effects of an electric arc.

6. A metallurgical furnace comprising in its construction, a chamber with an inclined bottom, means for creating a reducing atmosphere therein, an independent chamber, means for rotating said chamber, means for heating said chamber, a chamber situated under said chambers, and means for subjecting the material passing through said last-named chamber to the physical effects of an electric arc.

7. A metallurgical furnace comprising in its construction, a reducing-chamber, an independent heating-chamber, an electrically-heated chamber, a basin under said last-named chamber, an oxidizing-chamber, means for creating the required temperatures in said chambers, flues leading from said basin and oxidizing-chamber and discharging around the heating-chamber and into the reducing-chamber, and an exit-flue from the reducing-chamber.

8. A metallurgical furnace comprising in its construction, a chamber in which an ore-body may be reduced, a second chamber in which a metal, flux or other body may be highly heated apart from the ore-body, an electrically-heated chamber, said reducing and heating chambers adapted to discharge into the electrically-heated chamber, means for creating the required temperatures in the reducing and heating chambers, and means in the electrically-heated chamber for subjecting the materials discharged into it to the physical effects of an electric arc.

9. A metallurgical furnace comprising in its construction, a calcining-chamber having an inclined bottom, a rake moving over the bottom of said chamber, a reducing-chamber connected at its top to the calcining-chamber, an electrically-heated chamber connected at its top to the bottom of the reducing-chamber, a heating-chamber adapted to discharge into the top of the electrically-heated chamber, and means for creating the required temperatures in said reducing, electric and heating chambers.

10. A metallurgical furnace comprising in its construction, a chamber in which an ore-body may be reduced, a separate chamber in which a body to be combined with the ore-body may be highly heated, a chamber into which the reduced ore-body and the highly-heated body may be simultaneously discharged and therein subjected to the physical effects of an electric arc, and means for creating the required temperatures and atmospheres in the respective chambers.

11. A metallurgical furnace comprising in its construction, a reducing-chamber, a separate chamber in which a body to be combined with the ore-body may be highly heated, an electrically-heated chamber, a basin under said chamber, an oxidizing-chamber, a hearth in said oxidizing-chamber into which the basin is adapted to discharge, means for creating the required temperatures in said chambers, and means for forcing air into the hearth of said oxidizing-chamber.

12. A metallurgical furnace comprising in its construction, a vertically-arranged electrically-heated chamber, a reducing-chamber, a heating-chamber, a door in the side of the reducing-chamber, a feed-hopper connected to the heating-chamber, said reducing and heating chambers adapted to discharge into the top of said electrically-heated chamber, and means for creating the required temperatures in said chambers.

13. A metallurgical furnace comprising in its construction, a vertically-disposed electrically-heated chamber, means in said chamber for heating the same to the temperature of an electric arc, a rotary inclined heating-chamber adapted to discharge into the top of the electric chamber, and means for heating said rotary chamber.

14. Means for reducing an ore to form pig metal and commercially-valuable bodies, which consists in a chamber provided with means for creating a reducing atmosphere into which the ore in a heated condition is introduced and reduced, a chamber provided with means for heating said chamber to a high temperature into which the bodies to be combined with the ore are introduced and heated, a chamber provided with means for raising the temperature of said chamber to that of the electric arc and into which the heated bodies from the reducing and heating chambers are introduced and caused to traverse such chamber.

15. Means for reducing an ore to form pig metal and commercially-valuable bodies, which consists in a chamber provided with means for creating a reducing atmosphere into which the ore in a heated condition is introduced and reduced, a chamber provided with means for heating said chamber to a high temperature into which the bodies to be combined with the ore are introduced and heated, a chamber provided with means for raising the temperature of said chamber to that of the electric arc and into which the heated bodies from the reducing and heating chambers are introduced and caused to traverse such chamber, and a basin provided with heating means into which the combined bodies from the electrically-heated chamber flow and in which they may be separated by gravity.

16. Means for reducing an ore to form pig metal and commercially-valuable bodies, which consists in a chamber provided with means for creating a reducing atmosphere into which the ore in a heated condition is introduced and reduced, a chamber provided with means for heating said chamber to a high temperature into which the bodies to be combined with the ore are introduced and heated, a chamber provided with means for raising the temperature of said chamber to that of the electric arc and into which the heated bodies from the reducing and heating chambers are introduced and caused to traverse such chamber, a basin provided with heating means into which the combined bodies from the electrically-heated chamber flow and in which they may be separated by gravity, a chamber provided with means for creating an oxidizing atmosphere into which the metal from the basin is introduced and oxidized, and a passage-way between said basin and last-named chamber.

17. Means for effecting the metallurgical results specified within a single structure, comprising a reducing-chamber, a heating-chamber, an electrically-heated chamber, an oxidizing-chamber, heating devices for producing the required atmospheres and temperatures in said chambers, and a device by means of which an air-blast may be introduced into the oxidizing-chamber.

In testimony whereof I affix my signature in the presence of two witnesses.

GEO. H. BENJAMIN.

Witnesses:
J. E. PEARSON,
FRANK O'CONNOR.